United States Patent

Musser

[11] 4,074,061
[45] Feb. 14, 1978

[54] UNSATURATED POLYESTER CONTAINING FORMAL LINKAGES

[75] Inventor: Harry Robert Musser, Kingsport, Tenn.

[73] Assignee: Eastman Kodak Company, Rochester, N.Y.

[21] Appl. No.: 735,856

[22] Filed: Oct. 26, 1976

[51] Int. Cl.² .............................................. C07C 69/60
[52] U.S. Cl. ................................ 560/193; 260/73 L; 560/81; 560/198
[58] Field of Search ............ 260/485 G, 73 L, 475 P; 560/81, 193, 198

[56] References Cited

U.S. PATENT DOCUMENTS 2,366,738   1/1945   Loder et al. ..................... 260/485 G Primary Examiner—Jane S. Myers
Attorney, Agent, or Firm—Charles R. Martin; D. B. Reece, III

[57] ABSTRACT

Disclosed is an unsaturated polyester containing formal linkages. The polyester is comprised of the following repeating unit

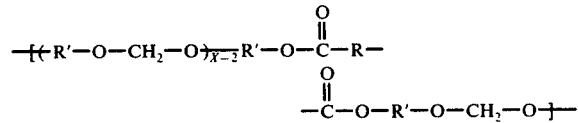

wherein X is a positive integer from 2 to 10, R is the divalent radical remaining after removal of the terminal carboxyl group from an α,β-ethylenically unsaturated dicarboxylic acid, and R' is the divalent radical remaining after removal of the terminal hydroxyl groups from an aliphatic or cycloaliphatic glycol. The polyesters of this invention exhibit a combination of a desirable hardness and a desirable impact strength upon curing.

5 Claims, No Drawings

UNSATURATED POLYESTER CONTAINING FORMAL LINKAGES

This invention relates to an unsaturated polyester that exhibits a combination of a desirable impact strength and desirable hardness upon curing.

Crosslinkable resins are currently in wide use in the coatings industry. Although many types of crosslinkable resins have been evaluated as the base resin in coatings, the crosslinkable resin that is typically used in the automotive industry is an acrylic copolymer in a solvent.

Although acrylics in solvent systems do have many advantages, one disadvantage is the relatively poor performance of the finished coatings. One theory advanced to explain the relatively poor performance of acrylics is that the molecular weight of the acrylic is too low. The molecular weight cannot be increased to enhance the performance because an increase in molecular weight would cause the coating to be too viscous to be applied using conventional techniques.

High molecular weight polyesters offer a better overall balance or properties than acrylics; however, the same problem is experienced with high molecular weight polyesters as with acrylics. That is, when the molecular weight of the polyester becomes sufficiently high to create the better overall balance of properties, the polyester becomes too viscous to be applied using conventional techniques.

We have now invented an unsaturated polyester that exhibits a desirable overall balance of physical properties and, in addition, has enhanced impact strength and has a low enough viscosity to be easily applied using conventional techniques. We have accomplished this remarkable achievement by incorporating formal linkages $$-O-CH_2-O-$$

into an unsaturated polyester.

The repeating unit of the polyester of this invention is composed of an essential portion

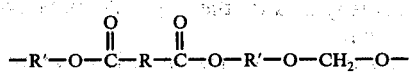

and an optional portion $$-R'-O-CH_2-O-$$

The essential portion of repeating unit is composed of three different parts. The first part is the divalent radical

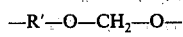

obtained by removal of the terminal hydrogen atoms from an $\alpha,\beta$-ethylenically unsaturated dicarboxylic acid. The second part is the divalent radical $$-R'-$$

obtained by removal of the terminal hydroxyl groups from a glycol. The third part is a formal linkage $$-O-CH_2-O-$$

obtained by condensation of one mole of formaldehyde with two moles of hydroxy.

The optional portion of the repeating unit is composed of two parts. The first part is the divalent radical $$-R'-$$

obtained by removal of the terminal hydroxyl groups from the glycol. The second part is the formal linkage $$-O-CH_2-O-$$

Thus, the polyester of this invention can be described as comprised of the following structure

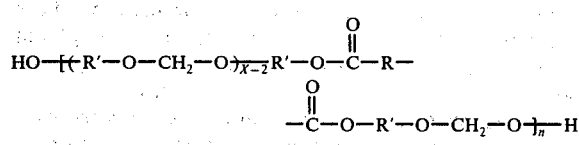

where X is a positive integer from 2 to 10, R is the divalent radical remaining after removal of the terminal carboxyl groups from an $\alpha,\beta$-ethylenically unsaturated dicarboxylic acid, and R' is the divalent radical remaining after removal of the terminal hydroxyl groups from an aliphatic or cycloaliphatic glycol containing from 6 to 10 carbon atoms.

The prior art the applicants are aware of is U.S. Pat. Nos. 3,441,632, 3,519,698, 3,532,768, 3,532,770, 3,741,935, 3,736,284, 3,673,148, 3,654,193, 3,616,397, 3,598,770, 3,551,235, 3,414,635, 2,945,835, 2,853,462; British Pat. Nos. 1,255,211, 1,182,225; German Pat. No. 2,420,707; Belg. Pat. No. 746,542; and Jap. Pat. No. 73/08353.

Applicants regard the closest prior art to be U.S. 3,441,632. The polyesters of this invention are thought to be unobvious over the polymers disclosed in U.S. Pat. No. 3,441,632 because the polyesters of this invention exhibit a combination of unobvious hardness and unobvious impact strength compared to the hardness and impact strength that would be expected of these polymers in view of the hardness and impact strength of the polymers disclosed in U.S. Pat. No. 3,441,632.

The $\alpha,\beta$-ethylenically unsaturated dicarboxylic acids useful in this invention are well known in the art. Examples are maleic acid, fumaric acid, itaconic acid, p-carboxycinnamic acid, citraconic acid, and the like. Preferably the dicarboxylic acid is fumaric or maleic acid. Mixtures of dicarboxylic acids can be used. By use of the term "dicarboxylic acid" we mean either the acid form of the bis ester form. Specifically include within the term "dicarboxylic acid" are the bis esters, such as the bis alkyl esters.

The aliphatic or cycloaliphatic glycols containing 6 to 10 carbon atoms useful in this invention are well known in the art. Examples of suitable glycols are 1,5-hexanediol, 1,7-heptanediol, 1,8-octanediol, 1,10-decanediol, 2,2,4-trimethyl-1,6-hexanediol, 1,4-cyclohexanediol, 1,2-cyclohexanedimethanol, 1,3-cyclohexanedimethanol, 1,4-cyclohexanedimethanol, 2,2,4-tetramethyl-1,3-cyclobutanediol. Preferably the glycol is 1,4-cyclohexanedimethanol. Mixtures of glycols can be used.

In this invention the formaldehyde can be in various forms such as paraformaldehyde, gaseous formaldehyde or a dialkyl formal. Paraformaldehyde is preferably used because of its ease in handling, lack of color forming impurities, and its ability to form high molecular weight polyformals.

The polyester of this invention has a molecular weight of at least 1,000 and preferably is in the range of 1,000 to 3,000. By the term "molecular weight" we mean number average molecular weight as determined by ebulliometric boiling point elevation. Of course, the value of $n$ is a sufficient number of repeating units to achieve the required molecular weight with whatever dicarboxylic acids and diols are used.

Although the value of X can be from 2 to 10, preferably X is in the range of 2 to 3, more preferably 2.05 to 2.5. It is preferable for X to be greater than 2 because when X is greater than 2 an excess of glycol is being used in the first step of the process for preparation of the polyesters of the invention and the use of excess glycol facilitates ester interchange. When X is 2 the optional portion of the repeating unit does not exist.

The polyester of this invention can be prepared by a process comprising two steps. The first step comprises reacting the glycol with the dicarboxylic acid to form a glycol/dicarboxylic acid reaction product. If the acid form of the dicarboxylic acid is used, the reaction is a conventional direct condensation reaction. Preferably the bis ester of the dicarboxylic acid is used and the first step is a conventional ester interchange reaction. It precisely two moles of glycol are used for each mole of dicarboxylic acid, the reaction product is composed of the bis glycol ester of the dicarboxylic acid. If an excess of glycol is used, the reaction product is composed of a mixture of the bis glycol ester of the dicarboxylic acid and excess glycol. The second step is composed of polymerizing the glycol/dicarboxylic acid reaction product of the first step with formaldehyde to form the polyester of the invention composed of recurring units containing formal linkages and divalent radicals contributed from the glycol/dicarboxylic acid reaction product.

The first step can be represented by the equation

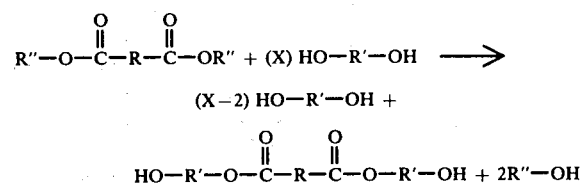

where R" is —H or a suitable monovalent organic radical.

Since there must be at least 2 moles of glycol for each mole of dicarboxylic acid, X must be at least 2, but can be up to 10.

The second step can be represented by the equation

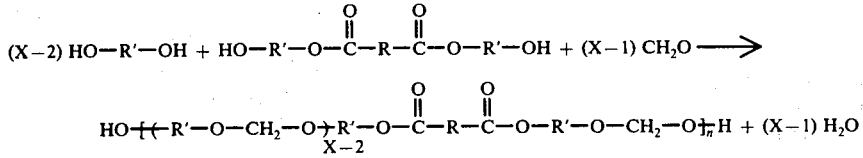

The first step of the process for preparing the polyester of the invention can be accomplished by contacting the glycol and the dicarboxylic acid under bis glycol ester forming conditions of the type well known in the art. When the first step is an ester interchange reaction, the bis ester of the dicarboxylic acid can be stirred with the glycol and two moles of alcohol are removed for each mole of bis ester of dicarboxylic acid. The conditions used to form the ester interchange product can vary widely depending on the particular desires of the practitioner of the invention. Thus, one skilled in the art could select a wide variety of conditions of pressure, temperature and time of reaction suitable to form the glycol/dicarboxylic acid reaction product. One example of conditions that can be used is atmospheric pressure, a temperature of 175° to 200° C. and a reaction time of about 3 hours. Other thermodynamic conditions and times of reaction can be used. Conventional catalysts, such as titanium tetraisopropoxide, zinc acetate and magnesium acetate, can be used if desired.

The second step of the process for preparing the polyester of this invention can be accomplished by contacting formaldehyde and the glycol/dicarboxylic acid reaction product in a solvent under polymerization conditions in presence of a suitable acid catalyst.

The solvent useful in the second step of the process can comprise a solvent that is inert with regard to the reactants. Although many conventional solvents can be used, benzene, toluene, and hexane are preferred because of their cost and availability.

The pressure used for the polymerization reaction can vary widely. Pressures higher than atmospheric can be used but water removal is, of course, more difficult at elevated pressures. Pressures lower than atmospheric can be used, but low pressures are to some extent undesirable because low pressures will tend to allow the formaldehyde to escape from the inert solvent. Atmospheric pressure is preferred because of the ease of creation as well as the minimization of undesirable side effects.

The temperature used for the polymerization reaction can also vary widely. Temperatures above about 120° C. can be used but are to some extent undesirable because the formaldehyde will tend to escape from the polymerization solvent. In a preferred embodiment the temperature is about 60°-110° C. In this embodiment the reaction mixture can be heated at reflux to azeotropically remove the water created by condensation of the formaldehyde and the glycol/dicarboxylic acid reaction product.

The acid catalyst of this invention can be a wide variety of catalysts that function as proton donors to catalyze the polymerization reaction. Examples of acids that could be used include, p-toluenesulfonic acid, sulfuric acid, trifluoromethanesulfonic acid, methanedisulfonic acid, camphorsulfonic acid and perchloric acid.

In this invention the formaldehyde can be in various forms including paraformaldehyde. When paraformaldehyde is used the acid catalyst not only functions as a proton donor to catalyze the polymerization reaction, but, in addition, functions to depolymerize the paraformaldehyde.

The contact between the glycol-dicarboxylic acid reaction product and formaldehyde can be preferably effected by merely stirring a solution of the formaldehyde and glycol-dicarboxylic acid reaction product in the solvent. If desired, other contacting procedures well known in the art could be used, such as packed towers, bubble towers and the like.

After polymerization is complete, isolation of the polyester can be accomplished by techniques well known in the art such as filtration, removal of the solvent or precipitation in a nonsolvent, such as methanol.

The solution viscosity of the polyester of this invention can be varied by adjusting the hydroxyl number. The hydroxyl number can be adjusted by small adjustments in the amount of paraformaldehyde added.

The molecular weight of the polyester of this invention can be increased by subsequent addition of incremental amounts of paraformaldehyde after the removal of initial water formed during the condensation reaction.

A specific example of the preparation of a polyester of this invention comprised of 1 mole of fumaric acid, 2.5 moles of 1,4-cyclohexanedimethanol and 1.5 moles of formaldehyde is now presented.

A glycol/dicarboxylic acid reaction product is prepared in accordance with the first step of the process for preparing the polyester of this invention. In a 500-ml., three-neck flask fitted with $N_2$ purge, stirrer, and condenser are placed 76.0 grams (0.33 mole) of dibutyl furmarate, 120 grams (0.83 mole) of 1,4-cyclohexanedimethanol (70% trans) and 100 ppm titanium (as titanium tetraisopropoxide). The flask is heated to 175° C. with stirring. The temperature is maintained at 175° C.-200° C. for a period of 3 hr. during which time 0.66 mole of butanol distills out of the reaction mixture.

The polyester of the invention is then prepared in accordance with the second step of the process for preparing the polyester of the invention. After 3 hr. the flask is cooled to 125° C. and the reaction mixture transferred to 1000-ml., three-neck flask fitted with stirrer, Dean-Stark trap, and condenser. To the reaction mixture is added 200-ml. of toluene, 15 grams (0.5 mole) paraformaldehyde, and 0.5 grams of p-toluene-sulfonic acid. The reaction mixture is allowed to stir at 60° C. for a period of 1 hr. after which the temperature is raised to reflux and 9-ml. of water collected over a period of 1 hour. The slightly hazy solution is then cooled to 25° C. and 10 drops of ammonium hydroxide added. After stirring for one hour the solution is filtered through a 350-ml. medium fitted glass funnel. A small portion of the resultant toluene solution is stripped of solvent at 125° C. to give a viscous, hazy polymer having a molecular weight of 2000, a hydroxy number of 54.2 and a $T_g$ of $-19°$ C.

The polyesters of this invention are useful as coatings when cured alone or in combination with vinyl type monomers or polymers.

The polyesters of this invention can be used as curable coatings in accordance with techniques well known in the art. The polyester may be dissolved in a suitable solvent and, in the presence of a free radical initiator, be dried and cured to hard, insoluble coatings. Initiators can be used in concentrations of 0.01-2.0%, based on total solids content, and include, but are not limited to, the following: benzoyl peroxide, lauryl peroxide, cument hydroperoxide and azobisisobutyronitrile. The solvent cast coatings can be cured at temperatures ranging from 75° C.-250° C. for time periods of 30 seconds to 60 minutes. The time and temperature of the cure cycle can be dependent on type of catalyst, thickness of coating, and degree of unsaturation present in the polyester. As a specific example, a coating can be prepared from the polyester of this invention by adding 0.1 gram of benzyl peroxide to a blend of 10 grams of toluene and 10 grams of the polyester. The resultant solution can be cast on a steel panel to give a wet film thickness of about 3 mil. After the film dries to a tacky consistency it is allowed to cure in a forced air oven for 20 minutes at 120° C. The resultant nontacky coating has a desirable overall balance of properties, including good hardness and good impact strength.

In addition to cured coatings of the polyester alone, cured coatings can be prepared using the polyesters of this invention in combination with various other unsaturated monomers and polymers. These include, but are not limited to, 1,4-cyclohexanedimethanol dimethacrylate, pentaerythritol tetraacrylate, trimethylolpropane trimethylacrylate, styrene, methyl methacrylate, triallyl cyanurate, and the like. In one aspect of this invention, the admixed vinyl monomers are added to the polyester to give one equivalent of vinyl monomer per equivalent of aliphatic unsaturation present in the polyester.

The polyesters of this invention are also useful in the preparation of sheet molding compound compositions. Sheet molding compounds prepared from the polyesters of the invention are less rigid, and consequently more resilient, than typical commercially available sheet molding compound compositions. The polyesters are easily soluble in styrene, have excellent cure rates, and manageable peak exotherm temperatures. When completely compounded with appropriate fillers, thickening agents, and low profile additives, sheet molding compound compositions prepared using the polyesters of this invention exhibit less rigidity without detracting from other important physical properties. These compositions are useful in automotive facia design, shower enclosures, and other applications where resiliency is required.

As will be recognized from the description of manner in which the polyesters of this invention can be used, a wide variety of materials can be blended with the polyesters. When the polyesters are used as coatings, examples of additives that can be incorporated into the polyesters include pigments, stabilizers and other conventional coating additives. When the polyesters are used in sheet molding compound compositions, examples of additives that can be incorporated into the polyesters include fillers, glass fibers, catalysts, low profile additives thickening agents and the like.

The invention has been described in detail with particular reference to preferred embodiments thereof, but it will be understood that variations and modifications can be effected within the spirit and scope of the invention.

I claim:

1. A polyester having a molecular weight in the range of 1,000 to 3,000 comprised of the following structure

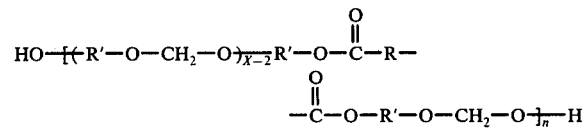

X is a positive number from 2 to 10, $n$ is a sufficient number of repeating units to achieve the required molecular weight, R is the divalent radical remaining after removal of the terminal carboxyl groups from an α,β-ethylenically unsaturated dicarboxylic acid, and R' is the divalent radical remaining after removal of the terminal hydroxyl groups from an aliphatic or cycloaliphatic glycol selected from the group consisting of 1,6-hexanediol, 1,7-heptanediol, 1,8-octanediol, 1,10-decanediol, 2,2,4-trimethyl-1,6-hexanediol, 1,4-cyclohexanediol, 1,2-cyclohexanedimethanol, 1,3-cyclohexanedimethanol, 1,4-cyclohexanedimethanol, 2,2,4,4-tetramethyl-1,3-cyclobutanediol.

2. The polyester of claim 1 wherein the α,β-ethylenically unsaturated dicarboxylic acid is furmaric acid or maleic acid.

3. The polyester of claim 1 wherein the glycol is 1,4-cyclohexanedimethanol.

4. The polyester of claim 1 wherein X is in the range of 2 to 3.

5. A polyester having a molecular weight in the range of 1,000 to 3,000 comprised of the following structure

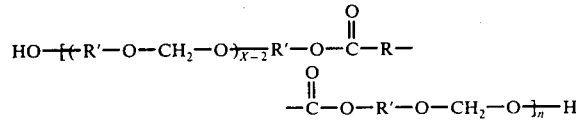

X is in the range of 2.05 to 2.5, $n$ is a sufficient number of repeating units to achieve the required molecular weight, R is the divalent radical remaining after removal of the terminal carboxyl groups from fumaric acid, and R' is the divalent radical remaining after removal of the terminal hydroxyl groups from 1,4-cyclohexanedimethanol.

* * * * *